No. 700,246. Patented May 20, 1902.
C. L. & R. A. SCHULTZ.
FLEXIBLE COUPLING.
(Application filed Sept. 14, 1900.)

(No Model.)

Witnesses:
J. W. McMahon.
G. S. Noble

Inventors,
Charles L. Schultz
Robert A. Schultz
By. H. C. Hansberger
Att'y.

UNITED STATES PATENT OFFICE.

CHARLES L. SCHULTZ AND ROBERT A. SCHULTZ, OF CHICAGO, ILLINOIS.

FLEXIBLE COUPLING.

SPECIFICATION forming part of Letters Patent No. 700,246, dated May 20, 1902.

Application filed September 14, 1900. Serial No. 30,062. (No model.)

*To all whom it may concern:*

Be it known that we, CHARLES L. SCHULTZ and ROBERT A. SCHULTZ, citizens of the United States, residing at Chicago, county of Cook, and State of Illinois, have invented a new and useful Improvement in Flexible Couplings for Shafts, of which the following is a specification.

Our invention relates to that class of coupling by means of which the shaft may as occasion requires depart from a straight line, also expand and contract longitudinally to a limited extent to accommodate itself in a shifting or movable bearing, rendered necessary occasionally, as in traction-vehicles, where the rotary shaft operatively connected with the reversing-gear has one of its bearings suspended from the body, which rests on springs which are elevated and depressed according to the load carried. The shaft must then accommodate itself in length to the shifting movement of the body. We accomplish this purpose by means of the device illustrated in the accompanying drawings, in which—

Figure 1:
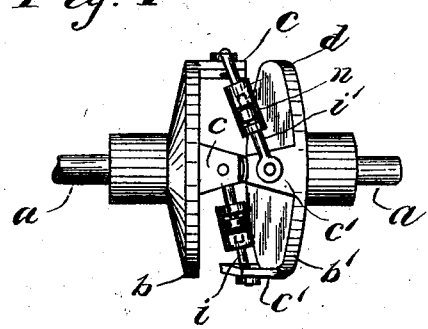
Figure 2:
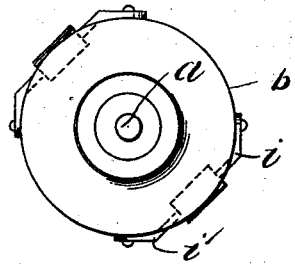
Figure 3:
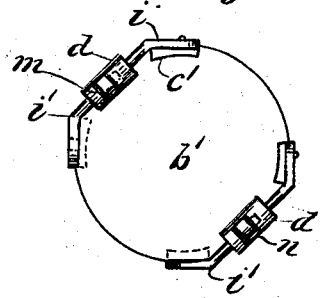
Figure 4:
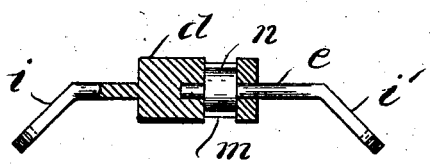
Figure 5:

Figure 1 is a side elevation of the flexible coupling. Fig. 2 is an end view of the same. Fig. 3 is a face view with one of the disks removed. Figs. 4 and 5 are details of the swivel members.

Similar letters refer to similar parts throughout the several views.

In the construction of the device, $a\ a$ represent the divided shaft. $b$ and $b'$ are two facing disks on the ends of the divided shaft $a$. Each facing disk is provided with two projecting lugs $c$ and $c'$ at opposite points and said disks are connected by means of two swivels constructed as shown in Figs. 4 and 5, each comprising two members $d$ and $e$, having bent arms $i$ and $i'$, the arm $i$ having a socket $m$ and the arm $i'$ having a collar $n$, which is adapted to fit into the socket $m$ and partially turn or play in the socket. The arms $i$ and $i'$ are attached to the lugs $c$ and $c'$ on the face of the disks—that is to say, the end of one arm to a lug on one of the disks, the other arm to a lug on the opposite disk, so that they appear diagonally across the face of the disks, as shown in the illustration, Fig. 1. This construction permits the disks to approach each other or to separate or increase the distance between the disks to shorten or lengthen the shaft, and also to permit the shaft to deviate to a limited extent from a straight line without affecting the power of the shaft.

Having thus described our invention, what we claim as new, and desire to protect by Letters Patent, is—

In a flexible coupling, a divided shaft, a disk on each of the ends of said divided shaft, said disks facing each other, two lugs projecting at a right angle from the face of each disk, said facing disks connected by means of two swivels having an extension-arm on each end, and each arm bent at an angle of forty-five degrees and engaging a lug on said facing disks, substantially as specified.

In testimony whereof we affix our signatures in presence of two witnesses.

CHARLES L. SCHULTZ.
ROBERT A. SCHULTZ.

Witnesses:
H. C. HUNSBERGER,
M. FAULDS.